United States Patent
Mak

(10) Patent No.: US 9,248,398 B2
(45) Date of Patent: *Feb. 2, 2016

(54) HIGH PRESSURE HIGH CO2 REMOVAL CONFIGURATIONS AND METHODS

(75) Inventor: John Mak, Santa Ana, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 649 days.

This patent is subject to a terminal disclaimer.

(21) Appl. No.: 13/496,302

(22) PCT Filed: Sep. 16, 2010

(86) PCT No.: PCT/US2010/049058
§ 371 (c)(1),
(2), (4) Date: May 29, 2012

(87) PCT Pub. No.: WO2011/034993
PCT Pub. Date: Mar. 24, 2011

(65) Prior Publication Data

US 2012/0227441 A1    Sep. 13, 2012

Related U.S. Application Data

(60) Provisional application No. 61/243,969, filed on Sep. 18, 2009.

(51) Int. Cl.
*B01D 53/14* (2006.01)

(52) U.S. Cl.
CPC ........ *B01D 53/1475* (2013.01); *B01D 53/1425* (2013.01); *B01D 2256/245* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| 2,826,266 A | 3/1958 | Hacmuth et al. |
| 3,664,091 A | 5/1972 | Hegwer |
| 4,833,171 A | 5/1989 | Sweeney |
| 6,235,961 B1 | 5/2001 | Kurukchi |
| 7,192,468 B2 | 3/2007 | Mak et al. |

(Continued)

FOREIGN PATENT DOCUMENTS

| GB | 1314215 | 4/1973 |
| JP | 58-500126 A | 1/1983 |

(Continued)

OTHER PUBLICATIONS

European Patent Office, "Supllementary European Search Report", EP Patent Application No. 10817809.3, National Phase of PCT/US10/49058, Nov. 18, 2013.

*Primary Examiner* — Amber Orlando
*Assistant Examiner* — Cabrena Holecek
(74) *Attorney, Agent, or Firm* — Fish & Tsang LLP

(57) ABSTRACT

CO2 is removed from high-pressure feed gas in configurations and methods according to the inventive subject matter by contacting feed gas with cooled semi-rich solvent to form a two-phase mixture that is flashed into the bottom section of an absorber. Rich solvent from the absorber is then reduced in pressure to generate refrigeration for the semi-rich solvent and lean solvent countercurrently contacts the partially treated feed gas in the absorber to produce the semi-rich solvent. Among other advantages, cooling of the feed gas and semi-rich solvent by the pressure reduced rich solvent heats the rich solvent to allow enhanced regeneration of the solvent, and external refrigeration and heating of the solvent can be entirely avoided.

7 Claims, 1 Drawing Sheet

(56) References Cited

U.S. PATENT DOCUMENTS

| | | |
|---|---|---|
| 7,424,808 B2 | 9/2008 | Mak |
| 2003/0155436 A1 | 8/2003 | Nilsen et al. |
| 2005/0172807 A1 | 8/2005 | Mak |
| 2006/0150812 A1 | 7/2006 | Mak et al. |
| 2006/0266214 A1 * | 11/2006 | Won .............................. 95/234 |

FOREIGN PATENT DOCUMENTS

| | | | |
|---|---|---|---|
| JP | 06-057287 A | 3/1994 | |
| JP | 11-050069 A | 2/1999 | |
| JP | 2005538841 A | 12/2005 | |
| JP | 2006509622 A | 3/2006 | |
| WO | 96/14135 | 5/1996 | |
| WO | 00/30738 | 6/2000 | |
| WO | 2004/052511 | 6/2004 | |
| WO | 2005/035101 | 4/2005 | |
| WO | 2008/103467 | 8/2008 | |
| WO | 2009/158064 | 12/2009 | |
| WO | WO 2009158064 A2 * | 12/2009 | ............. B01D 53/14 |
| WO | 2010/039785 | 4/2010 | |

\* cited by examiner

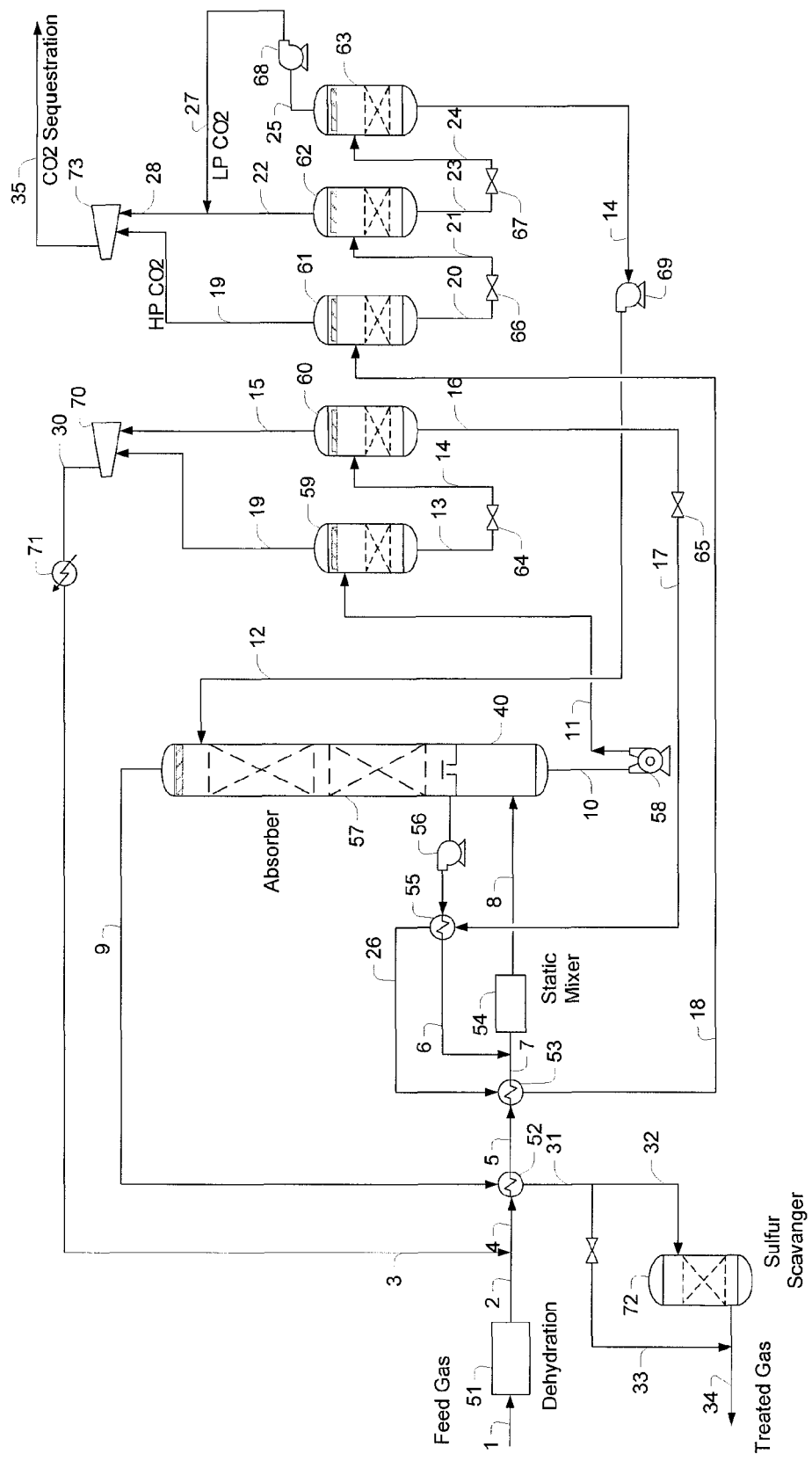

HIGH PRESSURE HIGH CO2 REMOVAL CONFIGURATIONS AND METHODS

This application claims priority to our U.S. provisional patent application with the Ser. No. 61/243,969, filed 18 Sep. 2009, and which is incorporated by reference herein.

FIELD OF THE INVENTION

The field of the invention is removal of acid gases from a feed gas, and particularly relates to acid gas removal from high pressure gases with high CO2 content and the production of a pipeline quality gas and a concentrated CO2 stream for enhanced oil recovery

BACKGROUND OF THE INVENTION

Acid gas removal from various gas streams and especially removal of CO2 from natural gas streams has become increasingly important as the sweet gas fields are being depleted. High CO2 gas fields remained unexplored, mostly due to their lower heating values and high capital and operating costs. However, with the recent increase of natural gas prices, gas producers started to explore these high CO2 fields. High CO2 gas fields exist in many regions of the world, including Alaska, Gulf of Mexico, South American and South China, particularly coal bed methane fields in North America. The CO2 content of these fields can reach 40 mol % and higher, which would require unconventional CO2 removal technologies to meet today's sales gas pipeline specifications, emissions requirements, and energy efficiency. Additionally, CO2 removed from these fields must be re-compressed to high pressure for Enhanced Oil Recovery and CO2 sequestration to reduce overall greenhouse gas emissions. Moreover, a viable CO2 removal process must also be economically viable and environmentally compliant.

There are numerous processes for acid gas removal known in the art, and all or almost all of those may be categorized into one of three categories. In the first category, a chemical solvent is employed that reacts with the acid gas to form a (typically non-covalent) complex with the acid gas. In processes involving a chemical reaction between the acid gas and the solvent, the feed gases are typically scrubbed with an alkaline salt solution of a weak inorganic acid as, for example, described in U.S. Pat. No. 3,563,695, or with alkaline solutions of organic acids or bases as, for example, described in U.S. Pat. No. 2,177,068. Such chemical reaction processes generally require heat regeneration and cooling of the chemical solvents, and often involve recirculation of large amounts of chemical solvent, thus making the use of chemical solvents uneconomical for the high CO2 gas fields.

In the second category, one or more membranes are used to separate CO2 from a gas stream based on differential permeability of the gas components. A typical membrane system includes a pre-treatment skid and a series of membrane modules. Membrane systems are often highly adaptable to treat high CO2 content gases, and are relatively compact making them particularly suitable for offshore application. However, they are susceptible to deterioration from heavy hydrocarbons and tend to require frequent and costly replacement. In addition, CO2 removal to a relatively low CO2 content (2 mol % or less) to meet sales gas specification typically requires multiple stages of membrane separators and re-compression between stages. More problematic is that the CO2 permeate contains a significant amount of methane since methane is also a fast gas. With high CO2 feed gases, methane losses from the membrane systems could be significant, making these applications also often uneconomical.

In the third category, a physical solvent is employed for removal of acid gas from a feed gas, wherein the acid gas is absorbed in an appreciable amount with the solvent. The physical absorption of the acid gas predominantly depends upon use of solvents having selective solubility for the particular acid gas (e.g., CO2 or H2S) and is further dependent upon pressure and temperature of the solvent. Since physical solvent unit operation follows the principal of Henry's law, CO2 loading of the solvent increases with the CO2 partial pressure in the feed gas, which would make physical solvents ideal for use in high pressure high CO2 gas fields. Solvent regeneration can be accomplished, to some extent, by flash regeneration, minimizing or eliminating the need of heating. However, the physical solvent processes require large cooling duty in removing the CO2 absorption heat, and may also need significant heating for solvent regeneration. Without improved methods and configurations, the physical processes may also be cost prohibitive.

Exemplary attempts have been undertaken for CO2 removal. For example, U.S. Pat. No. 7,273,513 teaches feeding gas stream and liquid stream into a first contactor where they are contacted co-currently and subjected to turbulent mixing conditions, and passing the multi-phase flow from the first contactor to a second contactor. While such process provides improved contacting devices suitable for amine solvents (chemical processes), it fails to address the methods and configurations for heat removal, solvent regeneration, hydrocarbon losses and CO2 production of physical solvent processes. Improved CO2 removal processes with physical solvents are described in WO2004/052511, U.S. Pat. No. 7,424,808, and U.S. Pat. No. 7,192,468, where an ultra-lean solvent is produced by recycle/clean gas stripping or use of a vacuum stripper, and where the feed gas is cooled by refrigeration obtained from treated gas and flashing of solvent. While such processes advantageously improve energy efficiency, various disadvantages nevertheless remain. For example, the absorber requires a relatively large number of contacting stages, and the overall process is relatively complex. In yet other known processes, as described in WO2010/039785, the lean solvent is regenerated using waste heat generated in the plant, and feed gas cooling is achieved by the treated gas. While such process typically simplifies plant configurations, cooling requirements are not met and a separate cooling circuit for the lean solvent is required.

Thus, although various configurations and methods are known to remove acid gases from a feed gas, all or almost all of them suffer from one or more disadvantages. Among other things, the CO2 levels in the treated gases are often high, and use of physical solvent requires significant solvent circulation and refrigeration cooling. Therefore, there is still a need to provide improved methods and configurations for efficient acid gas removal.

SUMMARY OF THE INVENTION

The present inventive subject matter is drawn to systems, configurations, and methods of removing acid gas from a feed gas, and most preferably a high-pressure hydrocarbon feed gas (e.g., above 1000 psia) with a relatively high CO2 content (e.g., equal or greater than 10 mol %) using a solvent process in which refrigeration requirements for absorption and heating requirements for regeneration are provided from within the treatment process.

In especially preferred aspects of the inventive subject matter, a method of removing CO2 from a feed gas includes a step of contacting the feed gas with a semi-rich solvent upstream of an absorber to produce a two-phase mixture that includes a rich solvent and a partially treated feed gas. In another step, the semi-rich solvent and the feed gas are cooled using refrigeration content that is generated by pressure reduction of the rich solvent.

Most preferably, the two-phase mixture is flashed into the bottom section of an absorber, in which the partially treated feed gas countercurrently contacts a lean solvent to so produce the semi-rich solvent. It is especially preferred that the cooling of the semi-rich solvent and the feed gas will heat the pressure-reduced rich solvent to a temperature that is sufficient to flash a CO2 rich vapor from the heated and pressure-reduced rich solvent. Pressure reduction of the rich solvent typically includes a step of flashing of the rich solvent to produce flashed vapors and the pressure-reduced rich solvent, wherein the flashed vapors are recycled to the feed gas. The pressure-reduced rich solvent is then further flashed to produce a CO2 rich vapor and the lean solvent.

While not limiting to the inventive subject matter, it is generally preferred that substantially all of the heat required to produce the lean solvent from the rich solvent is provided by the heat content of the feed gas and the semi-rich solvent, and/or that substantially all of the refrigeration required for absorption of the CO2 from the feed gas is generated by pressure reduction of the rich solvent.

Thus, in another aspect of the inventive subject matter, a method of removing CO2 from a feed gas includes a step of cooling a feed gas using refrigeration content of the treated gas and refrigeration content of the pressure-reduced rich solvent to form cooled feed gas. In another step, the cooled feed gas is combined with a semi-rich solvent to form a two-phase mixture that comprises a rich solvent and a partially treated feed gas. In still another step, the two-phase mixture is flashed into the bottom section of an absorber, while the partially treated feed gas is counter-currently contacted in the absorber with the lean solvent to so form the semi-rich solvent and the treated gas. Most typically, the pressure-reduced rich solvent is heated by the feed gas and the semi-rich solvent to a temperature sufficient to allow flashing of a CO2 rich vapor from the heated pressure-reduced rich solvent. As noted before, it is generally preferred that substantially all of the heat required to produce the lean solvent from the rich solvent is provided by the heat content of the feed gas and the semi-rich solvent, and/or that substantially all of the refrigeration required for absorption of the CO2 from the feed gas is generated by pressure reduction of the rich solvent and cooling effect of the hydraulic turbines. In further preferred aspects, the step of combining the cooled feed gas with the semi-rich solvent is performed using a static mixer, and/or the semi-rich solvent is pumped from absorber operating pressure to feed gas pressure prior to the step of combining the cooled feed gas with the semi-rich solvent. Contemplated configurations and methods allow relatively high temperatures of the lean solvent, typically at or above 30° F.

Viewed from a different perspective, a plant for removal of an acid gas from a feed gas will include an absorber that receives in a bottom section a two-phase mixture comprising a rich solvent and a partially treated feed gas, and that produces a semi-rich solvent from a lean solvent and a treated feed gas. A first heat exchanger cools the semi-rich solvent using refrigeration content of a pressure-reduced rich solvent to thereby produce a cooled semi-rich solvent, and a second heat exchanger cools a feed gas using refrigeration content of the pressure-reduced rich solvent to thereby produce a cooled feed gas. A mixing device (e.g., static mixer) then receives and mixes the cooled semi-rich solvent with the cooled feed gas to so produce the two-phase mixture.

In especially preferred aspects of such plants, a first plurality of flash vessels are fluidly coupled to the absorber and produce the pressure-reduced rich solvent and flashed vapors using hydraulic turbines or letdown valves, and a second plurality of flash vessels are optionally fluidly coupled to the first plurality of flash vessels, wherein the second plurality of flash vessels produce the lean solvent and a CO2 rich vapor. Most typically, a pump is fluidly coupled to the absorber, receives semi-rich solvent, and increases pressure of the semi-rich solvent from absorber pressure to feed gas pressure, and/or a sulfur scavenger bed is fluidly coupled to the absorber and receives and desulfurizes at least a portion of the treated feed gas.

Various objects, features, aspects and advantages of the present invention will become more apparent from the following detailed description of preferred embodiments of the invention.

BRIEF DESCRIPTION OF THE DRAWING

FIG. 1 is an exemplary schematic for acid gas removal using a physical solvent for a plant according to the inventive subject matter.

DETAILED DESCRIPTION

The present invention is directed to configurations and methods of treating a feed gas having relatively high pressure and CO2 content with a physical solvent in a process in which the feed gas is first contacted with cooled semi-rich solvent and in which the so produced mixture is flashed into the bottom section of an absorber that produces a rich solvent bottom product, a semi-rich solvent, and a treated feed gas. Most preferably, the rich solvent is then depressurized using hydraulic turbines to lower pressure to generate a pressure-reduced rich solvent having sufficient refrigeration content to cool the semi-rich solvent and the feed gas. It should be particularly appreciated that such cooling produced by the JT effect and/or the hydraulic turbines not only reduces, and more typically even eliminates the need for external refrigeration, but also heats the pressure-reduced rich solvent to a temperature that allows regeneration of a lean solvent where the heated pressure-reduced rich solvent is further flashed to or below atmospheric pressure. Thus, both refrigeration requirements and heating duty are provided from within the process.

In one particularly preferred aspect of the inventive subject matter, contemplated plants and methods use a semi-rich solvent from the absorber that is pumped from absorber pressure to feed gas pressure and cooled prior to mixing with chilled feed gas (e.g., in a static mixer, dynamic mixer, jet mixer, etc.) to so form an equilibrium mixture that is subsequently separated in the bottom portion of the absorber (which typically acts as a flash vessel and in most cases does not have multiple equilibrium stages). Consequently, it should be appreciated that such mixing and pre-chilling of the feed gas reduces the CO2 content in the feed gas by at least 50%, significantly reducing the packing height in the absorber.

Moreover, contemplated configurations and methods also allow for recovery of a high pressure high-CO2 stream from the feed gas, typically using multiple flashing stages after the pressure reduced rich solvent is heated by the semi-rich solvent and the feed gas (optionally also with additional or alternative waste heat sources). Still further, the flashed vapors that are produced during the reduction in pressure of the rich solvent from the bottom portion of the absorber are generally high in hydrocarbon content and will be recycled to the feed gas. In that way, hydrocarbon losses are reduced to equal or less than 5%, more typically equal or less than 3%, and most typically equal or less than 1%.

One exemplary plant configuration according to the inventive subject matter is depicted in FIG. 1. Here, feed gas stream 1, typically at 1315 psia and 110° F., with a flow rate of 200 MMscfd containing 50 mol % $CO_2$, is dried in a dehydration unit 51, which is typically necessary to avoid hydration formation in the downstream gas treating equipment. Suitable dehydration processes include glycol dehydration and molecular sieve dehydration units. The dried feed gas stream 2 is mixed with the recycle gas stream 3 forming stream 4 which is cooled by the treated gas stream 9 in exchanger 52 to about 80° F. The cooled gas stream 5 is further cooled by the flashed solvent stream 26 in exchanger 53 to about 30° F. The chilled feed gas stream 7 is then mixed with the chilled semi-rich solvent stream 6 (pump 56 increases pressure of the semi-rich solvent, typically from absorber operating pressure to feed gas pressure) in static mixer 54 forming a two phase mixture. The static mixer may include multiple contacting elements or spray nozzles that provide turbulence for mixing. It should be noted that the static mixer (or most other mixing devices) provides one equilibrium stage which removes over 50% of the $CO_2$ content, significantly reducing the packing height in the absorber 57.

Stream 8 from the static mixer is flashed to the bottom section 40 of the absorber 57, typically operating at a pressure of between 400-900 psia. Most typically, the absorber contains contacting devices, including packing or trays, or other suitable media for $CO_2$ absorption. The flashed vapor from the bottom section rises through a chimney tray and is contacted by about 4000 GPM of lean solvent stream 12, reducing its $CO_2$ content to equal or less than 2 mol %, producing the semi-rich solvent at about 30° F. that is pumped by pump 56 from absorber pressure to feed gas pressure, cooled in exchanger 55 by flashed solvent 17, and mixed with the chilled feed gas stream 7, and finally flashed to the bottom section of the absorber to form rich solvent stream 10 leaving the bottom section. The rich solvent is then letdown in pressure to 400 psia via hydraulic turbine 58 to form stream 11. Stream 11 is flashed to separator 59, producing flashed liquid stream 13 and flashed vapor stream 19. The vapor stream 19 is fed to the interstage of the recycle compressor 70. The flashed liquid 13 is letdown via JT valve 64 to 200 psia forming stream 14 that is flashed to separator 60, producing flashed liquid stream 16 and flashed vapor stream 15. The vapor stream 15 is fed to the suction of the recycle compressor 70, which produces recycle stream 30 that is cooled in cooler 71 to form recycle stream 3.

The flashed liquid stream 16 is letdown in JT valve 65 to about 70 to 100 psia, thereby forming chilled stream 17. The so chilled flashed solvent is used to provide cooling to the semi-rich solvent in exchanger 55 and feed gas in exchanger 53. The flashed solvent is heated in exchanger 53 to about 15 to 30° F. forming heated stream 18, which is then flashed in separator 61 producing high-pressure $CO_2$ stream 19 at about 100 psia. The flashed solvent 20 is further letdown in JT valve 66 to form stream 21 that is fed to the separator 62 producing a low-pressure $CO_2$ vapor 22 and a flashed liquid 23 that is further let down in pressure in JT valve 67 to form stream 24 having sub-atmospheric pressure, typically at 2 to 5 psia, which is then flashed to vacuum separator 63. The flashed vapor 25 from separator 63 is boosted in pressure by vacuum pump 68 forming stream 27 that is mixed with the low-pressure $CO_2$ stream 22 to form combined stream 28 prior to feeding into the $CO_2$ compressor 73. Compressed $CO_2$ stream 35 is then sequestered or used in enhanced oil recovery. The flashed lean solvent stream 14 is pumped by pump 69 forming stream 12 to feed the absorber completing the solvent circuit. The treated gas stream 9 from the absorber typically contains 1.2 mol % $CO_2$ and about 6 ppmv $H_2S$. To meet the 4 ppmv $H_2S$ sales gas specification, at least a portion 32 of the treated gas 31 is further treated (as needed) in sulfur scavenger bed 72 while another portion 33 bypasses the bed 72 to so form the combined treated gas stream 34. The overall plant balance is shown in Table 1.

TABLE 1

| | Stream Description | | | | |
|---|---|---|---|---|---|
| Component, Mol % | Feed Gas | Recycle Gas | Low Pressure $CO_2$ | High Pressure $CO_2$ | Treated Gas |
| $CO_2$ | 50.4 | 71.6 | 98.4 | 98.0 | 1.3 |
| N2 | 0.6 | 0.1 | 0.0 | 0.0 | 1.3 |
| C1 | 46.9 | 25.4 | 0.0 | 0.4 | 94.8 |
| C2 | 1.3 | 2.0 | 0.1 | 0.4 | 2.3 |
| C3 | 0.4 | 0.7 | 0.3 | 0.5 | 0.3 |
| IC4 | 0.1 | 0.1 | 0.2 | 0.1 | 0.0 |
| NC4 | 0.1 | 0.1 | 0.3 | 0.2 | 0.0 |
| IC5 | 0.0 | 0.0 | 0.1 | 0.1 | 0.0 |
| NC5 | 0.1 | 0.0 | 0.2 | 0.1 | 0.0 |
| NC6 | 0.1 | 0.0 | 0.2 | 0.1 | 0.0 |
| H2S | 100 ppmv | | | | 4 ppmv |
| Std Gas Flow, MMscfd | 200 | 49 | 20 | 82 | 99 |

It is especially preferred that plants and methods contemplated herein employ an absorber that includes an upper packed section and a bottom flash section, wherein the bottom section of the absorber produces a rich solvent and a vapor that is then counter-currently contacted (after passing through a chimney tray) by the lean solvent in the upper section, which generates the semi-rich solvent. Alternatively, the two-phase mixture may also be flashed in a separate high-pressure flash vessel in which the rich solvent is separated from the partially treated feed gas.

It should also be appreciated that unlike heretofore known physical solvent processes, the lean solvent operates at a higher temperature, consequently producing a semi-rich solvent at an even higher temperature at 30° F. or higher, and more typically at 35° F. or higher, which can then be cooled by the flashed solvent, avoiding temperature cross in the heat exchanger. Consequently, the pre-chilling, mixing, and flashing operation produces a pressure-reduced rich solvent at about 0° F. Consequently, it should be recognized that unlike conventional physical solvent processes, the process cooling presented herein is substantially completely (i.e., requires external refrigeration in an amount of less than 20%, and more typically less than 10% of total refrigeration requirement), and in most cases exclusively achieved with the refrigeration content of the pressure-reduced solvent.

It should also be recognized that the cooling of the feed gas and the semi-rich solvent will heat the pressure-reduced rich solvent to a relatively high temperature to enhance solvent regeneration. Thus, substantially all of the heat required (i.e., at least 80%, more typically at least 90% of the total heat required) to produce a lean solvent from the pressure-reduced rich solvent is provided by heat content of the feed gas and the semi-rich solvent.

Contemplated plants and methods also use multi-stage flash vessels that separate the hydrocarbon rich flash gases that are recycled to the absorber, recovering at least 95%, and more typically at least 98% of the hydrocarbon content. The heated pressure-reduced rich solvent is acid gas enriched and is letdown to lower pressure to at least one separator for the production of acid gases. Thus, using such configurations and methods, CO2 vapor streams can be produced at a relatively high pressure (and additionally at a medium and/or low pressure), which advantageously lowers compression requirements for the CO2 compressor.

It should be recognized that in such configurations the hydraulic turbine operates an energy efficient device as it generates refrigeration cooling by expansion and flashing of the acid gas content while providing shaft work to provide work (e.g., drive the solvent circulation pump or generate electric power). It should also be recognized that the multi-stage separators can be used to further improve efficiency and may be configured as stacked separators to minimize the plot space footprint and equipment cost, resulting in an even more efficient design.

With respect to suitable feed gases it should be appreciated that the pressure of such gases may vary considerably, and that the nature of the gas will at least in part determine the pressure. It is particularly preferred that the feed gas has a pressure of at least 400 psig, more typically at least 1000 psig, even more typically at least 1200 psig. Similarly, the nature of the solvent may vary considerably, and all physical solvents and mixtures thereof are deemed appropriate for use herein. There are numerous physical solvents known in the art, and exemplary preferred physical solvents include FLUOR SOLVENT™ (propylene carbonate), NMP (normal-methylpyrolidone), SELEXOL™ (dimethyl ether of polyethylene glycol), and TBP (tributyl phosphate), and/or various polyethylene glycol dialkyl ethers. Alternatively, other solvents including enhanced tertiary amine (e.g., piperazine) or other solvent or a mixture of solvents may be employed having similar behavior as physical solvent.

Likewise, flashing of the rich solvent may be performed using numerous devices, and it is generally contemplated that all pressure reduction devices are suitable for use herein. However, with respect to the amount of pressure reduction it is typically preferred that the rich solvent (after providing work and/or cooling) is let down in pressure to a pressure sufficient to release flashed vapors with methane content of about 20 to 70%. These vapors are recycled to the absorber minimizing methane losses to less than 5%, more preferably less than 3%, and most preferably less than 1%.

Consequently, it should be recognized that configurations according to the inventive subject matter will significantly reduce overall energy consumption and capital cost for high CO2 removal as compared to conventional acid gas removal processes, including amine or other physical solvents or membranes. Moreover, contemplated configurations and processes will typically not require an external heat source, and heat sources if required may be supplied by the feed gas or heat of compression either from refrigeration and/or feed gas compression system further reducing energy consumption and impact on the environment. Still further, enhanced oil recovery projects will frequently encounter an increase in acid gas concentration in the feed gas, typically to as high as 60%. Contemplated configurations and processes can accommodate these changes with essentially the same solvent circulation.

Thus, specific compositions and methods of CO2 removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of removing CO2 from a feed gas, comprising:
   contacting the feed gas with a semi-rich solvent upstream of an absorber at a pressure above an absorber operating pressure to produce a two-phase mixture comprising a rich solvent and a partially treated feed gas;
   separately cooling the semi-rich solvent and the feed gas prior to producing the two-phase mixture using refrigeration content generated by pressure reduction of the rich solvent; and
   flashing the two-phase mixture into a bottom section of an absorber to the absorber operating pressure.

2. The method of claim 1 wherein the partially treated feed gas countercurrently contacts a lean solvent in the absorber to so produce the semi-rich solvent.

3. The method of claim 1 wherein cooling of the semi-rich solvent and the feed gas heats the pressure-reduced rich solvent to a temperature sufficient to allow flashing of a CO2 rich vapor from the heated pressure-reduced rich solvent.

4. The method of claim 1 wherein pressure reduction of the rich solvent comprises a step of flashing of the rich solvent, thereby producing flashed vapors and pressure-reduced rich solvent, and wherein the flashed vapors are combined with the feed gas.

5. The method of claim 4 wherein the pressure-reduced rich solvent is further flashed to produce a CO2 rich vapor and a lean solvent.

6. The method of claim 1 wherein substantially all of the heat required to produce a lean solvent from the rich solvent is provided by heat content of the feed gas and the semi-rich solvent.

7. The method of claim 1 wherein substantially all of the refrigeration that is required for absorption of the CO2 from the feed gas is generated by pressure reduction of the rich solvent.

* * * * *